US009330262B2

(12) United States Patent
Salehie et al.

(10) Patent No.: US 9,330,262 B2
(45) Date of Patent: May 3, 2016

(54) SYSTEMS AND METHODS FOR RUNTIME ADAPTIVE SECURITY TO PROTECT VARIABLE ASSETS

(71) Applicant: University of Limerick, Castletroy, Limerick Co. (IE)

(72) Inventors: Mazeiar Salehie, Castletroy (IE); Liliana Pasquale, Castletroy (IE); Claudio Menghi, Chiuro (IT); Inah Omoronyia, Castletroy (IE); Bashar Nuseibeh, Castletroy (IE)

(73) Assignee: University of Limerick, Castletroy, Limerick Co. (IE)

( * ) Notice: Subject to any disclaimer, the term of this patent is extended or adjusted under 35 U.S.C. 154(b) by 288 days.

(21) Appl. No.: 14/033,371

(22) Filed: Sep. 20, 2013

(65) Prior Publication Data

US 2014/0090071 A1    Mar. 27, 2014

Related U.S. Application Data

(60) Provisional application No. 61/704,442, filed on Sep. 21, 2012.

(51) Int. Cl.
| | |
|---|---|
| *G06F 21/57* | (2013.01) |
| *G06F 21/50* | (2013.01) |
| *G06F 21/55* | (2013.01) |
| *H04L 29/06* | (2006.01) |

(52) U.S. Cl.
CPC .............. *G06F 21/577* (2013.01); *G06F 21/50* (2013.01); *G06F 21/55* (2013.01); *H04L 63/1408* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,209,101 B1 | 3/2001 | Mitchem et al. | |
| 6,219,805 B1 | 4/2001 | Jones et al. | |

(Continued)

FOREIGN PATENT DOCUMENTS

| | | |
|---|---|---|
| EP | 2207322 | 7/2010 |
| EP | 2207323 | 7/2010 |

OTHER PUBLICATIONS

Cheng et al., "Fuzzy Multi-Level Security: An Experiment on Quantified Risk-Adaptive Access Control," Proceedings of the IEEE Symposium on Security and Privacy, 2007, 6 pages.

(Continued)

*Primary Examiner* — David Le
(74) *Attorney, Agent, or Firm* — K&L Gates LLP

(57) ABSTRACT

A method of adapting a security configuration of a data processing application at runtime, and a system, together with its computing architecture, are disclosed. The system stores a causal network comprising a plurality of nodes and a plurality of incoming and outgoing causal links associated therewith, wherein each node of the causal network is associated with a security concern or a requirement that can be affected by any configuration of the security controls. The current value of assets nodes, as well as those of the security concerns that can be affected by monitored contextual factors, are updated. The control nodes corresponding to the security controls is updated according to the security configuration whose utility is evaluated by the causal network. The node corresponding to the at least one variable is updated with the determined current value, which is propagated through the causal network through the causal links associated with the updated node. The security configuration with the highest utility is selected and replaces the actual configuration by activating and/or deactivating the security functions corresponding to security control nodes enabled/disabled in the selected security configuration.

20 Claims, 9 Drawing Sheets

(56) References Cited

U.S. PATENT DOCUMENTS

| | | |
|---|---|---|
| 7,174,320 B2 | 2/2007 | Rothrock |
| 7,478,420 B2 | 1/2009 | Wright et al. |
| 7,676,470 B2 | 3/2010 | Arbajian |
| 8,010,997 B2 | 8/2011 | Limont et al. |
| 2008/0189788 A1 | 8/2008 | Bahl |
| 2012/0096549 A1 | 4/2012 | Amini et al. |
| 2012/0204267 A1 | 8/2012 | Prafullchandra et al. |

OTHER PUBLICATIONS

Covington et al., "Securing Context-Aware Applications Using Environment Roles," Proceedings of the ACM Symposium on Access Control Models and Technologies, 2001, pp. 10-20.

Elahi et al., "A Vulnerability-Centric Requirements Engineering Framework: Analyzing Security Attacks, Countermeasures, and Requirements Based on Vulnerabilities," Requirements Engineering, vol. 15, Mar. 2010, 29 pages.

Liu et al., "Security and Privacy Requirements Analysis within a Social Setting," Proceedings of the IEEE International Requirements Engineering Conference, 2003, pp. 151-161.

Sahinoglu, "Security Meter: A Practical Decision-Tree Model to Quantify Risk," Security & Privacy, IEEE, 3(3):18-24, 2005.

Sommestad et al., "Cyber Security Risks Assessment with Bayesian Defense Graphs and Architectural Models," Proceedings of Hawaii International Conference on System Sciences, Jan. 2009, pp. 1-10.

Qin et al., "Attack Plan Recognition and Prediction Using Causal Networks," Proceedings of the 20th Annual Computer Security Applications Conference (ACSAC'04), pp. 1-10.

Van Lamsweerde, "Elaborating Security Requirements by Construction of Intentional Anti-Models," Proceedings of the International Conference on Software Engineering, 2004, pp. 148-157.

SYSTEMS AND METHODS FOR RUNTIME ADAPTIVE SECURITY TO PROTECT VARIABLE ASSETS

CROSS REFERENCE TO RELATED APPLICATIONS

This application claims priority to and the benefit of U.S. Provisional Application No. 61/704,442, filed on Sep. 21, 2012, the entire disclosure of which is incorporated by reference herein.

FIELD OF THE INVENTION

The present invention relates to a method of configuring security controls and parameters embodied in a software application/device at runtime. More particularly, the present invention relates to a method, and a system adapting the security functions implemented in an application/device and parameters embodied therein to run-time changes to protect cyber and physical assets.

BACKGROUND OF THE INVENTION

Security is primarily concerned with the protection of assets from harm. Assets can be valuable physical objects such as computers or mobile communication devices, information such as bank details or medical records, and intangible properties such as reputation. However, despite their crucial role, known techniques still do not consider assets during the development and operation of secure software systems, after early stages of requirements engineering.

This may lead to solutions that partially protect the assets of interest without the possibility to adapt when assets change unexpectedly or the applied security configuration becomes ineffective due to changes in context, or inefficient because of high implementation costs. This issue is also ignored by risk analysis and management approaches. Existing risk assessment and mitigation techniques are typically static: they are not used at runtime to re-evaluate the risk or identify a proper set of security controls when asset and/or contextual factors change.

The variability of assets and context, their respective values, and other security concerns are crucial in protecting assets in different scenarios. For example, considering a smart home domain, constituent assets such as appliances, physical belongings and the like may change, be added or removed over time. If a new, valuable appliance is purchased and installed in the smart home, the potential for its compromising increases if an attacker could unlawfully gain access to the domain. It might therefore be necessary to apply stronger authorization and authentication mechanisms to access to the energy management system that controls all the appliances in the smart home. A prolonged absence of the smart home inhabitant may also increase the probability of unauthorized access by an intruder who might steal some or all of the assets. Accordingly, the smart home alarm system might need to be re-configured, for example to be remotely controlled.

Existing research mainly focuses on providing techniques for modeling the security concerns of a software system or for performing risk assessment and mitigation. The requirements engineering community has tried to represent security concerns (threats, vulnerabilities, security goals, requirements and controls) together with the other "conventional" requirements of the system, but has never conceived assets as first class entity to identify their impact on the criticality of security goals and on the identification on potential threats and attacks.

Van Lamsweerde, in "*Elaborating security requirements by construction of intentional anti-models*" (Proceedings of the International Conference on Software Engineering, 2004, pp. 148-157), augmented the known KAOS goal model with anti-goals (negation of security goals) to identify threats and attacks and to facilitate the elaboration of security requirements. L. Liu et al., in "*Security and Privacy Requirements Analysis within a Social Setting*" (Proceedings of the IEEE International Requirements Engineering Conference, 2003, pp. 151-161) use the i* goal model to represent security and privacy requirements. In particular, actors and their intent are used to identify potential attackers, while vulnerabilities come from organizational relationships among stakeholders. Similarly, Elahi et al., in "*A vulnerability-centric requirements engineering architecture: analyzing security attacks, countermeasures, and requirements based on vulnerabilities*" (Requirements Engineering, vol. 15, pp. 41-62, March 2010), enriched the i* goal model by adding vulnerabilities that can be brought by system operations and domain assumptions. Some further risk assessment methods identify assets at the requirements elicitation stages. However, changes of security concerns, especially changes of assets and vulnerabilities, and their impact on security are still overlooked during software development and at runtime.

To develop a secure software system, risk assessment and mitigation, i.e. the identification of most appropriate security controls, are fundamental activities. Sahinoglu, in "*Security meter: A practical decision-tree model to quantify risk*" (Security & Privacy, IEEE, vol. 3, no. 3, pp. 18-24, 2005), has built a decision-tree model by connecting vulnerabilities, threats and security controls together for risk quantification. Although this approach is promising, it suffers from the limitations inherent to a hierarchical tree structure, it still does not consider assets and their variability, and it provides no links to security goals.

Sommestad et al., in "*Cyber security risks assessment with Bayesian defense graphs and architectural models*" (Proceedings of Hawaii International Conference on System Sciences, January 2009, pp. 1-10), has extended the influence diagram for modeling attack and defense graphs for off-line analysis. However, this approach still does not consider assets and their variability, and it assumes that conditional probabilities can be collected completely from the domain.

Further research efforts on risk-adaptive solutions, for instance by P. Cheng et al. in "*Fuzzy multi-level security: An experiment on quantified risk-adaptive access control*" (Proceedings of the IEEE Symposium on Security and Privacy, 2007, pp. 222-230) and by M. Covington et al in "*Securing context-aware applications using environment roles*" (Proceedings of the ACM Symposium on Access Control Models and Technologies, 2001, pp. 10-20) have considered risk estimation and context variability, but still ignore the variability of assets and other security concerns as a source of risk change.

Further prior art documents relating to dynamic risk assessment and management, such as US 2008/0189788 A1 and U.S. Pat. No. 6,219,805, consider different OS, network and user risk factors. Still further prior art documents relating to adaptive security in information devices and portable information devices, such as EP 2207322 and EP 2207323, consider device location and network connections. U.S. Ser. No. 12/903,525 presents an adaptive security solution for estimating likelihood of attacks in computer networks. US 2012/0204267 A1 proposes an adaptive configuration management system, which is claimed to be adaptable for security purposes. However, none of these disclosures considers, nor implements, assets, their values and their variability over time as a prominent security risk-changing trigger.

Certain domain—specific prior art documents are known to relate to adaptive security. For instance, U.S. Pat. No. 7,676,470 addresses self-discovering in data-warehousing systems using adaptive and self-generating data security changes, U.S. Pat. No. 6,209,101 proposes a method to manage a dynamic set of servers for controlling access to resources, and U.S. Pat. No. 7,174,320 relates to adaptive digital content protection with adjustable security level depending on the performance and devices of media players.

In the mobile security domain, as a growing security domain, assets and their variability are significant in determining the appropriate security configuration. Mobile devices are equipped with a wide range of applications that are increasingly used to perform personal and business tasks. For example, typical assets in a mobile phone include the phone itself, one or more subscriber identifications modules (SIM, which may includes monetary phone credit), banking and/or credit card information (increasingly so with the ongoing acceptance and roll-out of contactless payment techniques), email information (addresses, passwords, sent/received messages), and contact lists. Users may accidentally give inappropriate permissions to applications, or installed applications may not encrypt sensitive information during transmission or storage. These vulnerabilities can facilitate potential attacks. Furthermore, increasing the value of an asset (e.g. the SIM card credit value) may increase the risk of loss. Adding new assets (e.g. manipulating new information such as credit card details) may raise the threat level, by increasing the probability of breaking confidentiality of credit card details. In this context, it is necessary to continuously adapt the mobile phone security configuration to protect the valuable assets in any situation.

Many prior art documents relate to administering security settings in mobile devices and enforcing them. In U.S. Pat. No. 8,010,997, a device setting is changed to comply with necessary protection requirements for the requested data. But there is no further monitoring of the requested data after the change or any other contextual changes, for adjusting security settings. In U.S. Pat. No. 7,478,420, a server enforces security policies based on security features, such as connection type, and the installed anti-virus application type. These disclosures typically take into account contextual changes, including network and location, without considering the key role of assets and why they are required to be protected (i.e. security goals and requirements). A paper entitled "Attack Plan Recognition and Prediction Using Causal Networks" by Qin and Lee, Georgia Institute of Technology, 2005, discloses a technique for predicting potential security attacks based on observed attack activities. This technique involves the modeling of attack trees, which are then used to build a Bayesian Network. Probabilistic inference is then applied to the Bayesian Network to correlate isolated attack scenarios derived from low-level alert correlations and predict future attack scenarios. It will be appreciated therefore that this technique is purely reactive, in that it only predicts future attack plans in response to security attacks which have already occurred.

An improved method of configuring security controls and parameters in a data processing application is therefore required, and a system embodying this method, which mitigate at least the above shortcomings of the prior art, preferably in real time as assets, their values and/or the security context change.

SUMMARY OF THE INVENTION

The present invention provides a method and system, as set out in the appended claims, wherein a systematic approach analyzes changes to variable assets and adjusts security controls constituting the security configuration according to the total risk of harm, the satisfaction of security goals and the impact that the security configuration has on functional and non-functional requirements.

According to an aspect of the present invention, there is therefore provided a method of adapting a security configuration in a data processing application processed by a data processing device in real-time, wherein the adaption is based on changes of assets associated with the security configuration and/or factors representative of the context of the data processing application, the method comprising the steps of storing a fuzzy causal network comprising a plurality of nodes and a plurality of incoming and outgoing causal links associated therewith, wherein at least application variables and security functions are assigned respective nodes, determining current values of valuable assets, determining a current security configuration as a set of security control nodes, updating the node corresponding to assets and other context-dependent security concerns with the determined current value, propagating the updated value through the fuzzy causal network through causal links associated with the updated node, processing the fuzzy causal network to determine a next security configuration consisting of an alternative set of security control nodes, and implementing the next security configuration by activating and/or deactivating corresponding security functions or enabling/disabling associated security policies.

In an embodiment of the method according to the invention, each node has an initial value and processing the fuzzy causal network preferably comprises the further step of processing the value of each node, by aggregating the respective values of one or more nodes associated with its incoming links.

In a variant of this embodiment, aggregating causal links is preferably according to a specific function selected from the group comprising min, max, sum, and average functions.

In an embodiment of the method according to the invention, each link comprises a weighing factor indicative of the strength of the causal relationship between two nodes at respective ends of the link, and propagating preferably comprises the further step of increasing or decreasing the value of one of the two nodes according to, respectively, a positive or a negative weighing factor.

In an embodiment of the method according to the invention, node values (except for the utility node) and/or weighing factors are preferably a fuzzy values between 0 and 1.

In an embodiment of the method according to the invention, partial security risks, a total security risk and a utility of security functions are preferably assigned respective nodes in the fuzzy causal network.

In a variant of this embodiment, each partial security risk node is indicative of the risk associated with a respective application or device attack harming protected assets, and processing the fuzzy causal network preferably comprises the further step of processing the value of the total security risk node, by aggregating the respective values of all partial security risk nodes.

In either of these embodiments, the utility node is preferably indicative of the utility of a security configuration, and processing the fuzzy causal network preferably comprises the further step of processing the value of the utility node, by aggregating a set of parameters representative of the risk of harm, the satisfaction of security goals and the impact that the required security functions have on the functional and non-functional requirements of the system.

In an embodiment of the method according to the invention, the method preferably comprises the further step of associating security controls having nodes in the fuzzy causal network with respective security functions implemented in the application and/or device.

According to another aspect of the present invention, there is also provided a system for adapting a security configuration in a data processing application processed by a data processing device at run-time, wherein the adaptation is based on changes of assets associated with the security configuration and/or factors representative of the context of the data processing application, the system comprising a fuzzy causal network having a plurality of nodes and a plurality of incoming and outgoing causal links associated therewith, wherein at least application variables and security functions are assigned respective nodes; and an adaptive security manager comprising means to monitor the current value of assets or contextual factors, means to assign a security function implemented in the controlled system/device to a security control node of the fuzzy causal network, wherein the adaptive security manager is configured to update the node corresponding to an asset or the nodes representing security concerns that can be affected by contextual factors with the determined current value, propagate the updated value in the fuzzy causal network through causal links associated with the updated node, process the fuzzy causal network to determine the utility of any security configuration consisting of an alternative set of security control nodes, select the security configuration with the highest utility, and implement it in the controlled application/device by activating and/or deactivating the security functions corresponding to the security controls nodes enabled in the selected security configuration.

In an embodiment of the system according to the invention, the adaptive security manager further comprises means to determine factors representative of the context of the data processing application.

In a variant of this embodiment, the means used to monitor a current value of assets presented in the fuzzy causal network is an asset monitoring module and the means to monitor factors representative of the context of the software application and/or the device under control is a context monitoring module.

In an embodiment of the system according to the invention, each node has an initial value and the security manager is further configured to aggregate the respective values of one or more nodes associated with its incoming links according to a specific function selected from the group comprising min, max, sum, average functions.

In an embodiment of the system according to the invention, each link comprises a weighing factor indicative of the strength of the causal relationship between two nodes at respective ends of the link, and the adaptive security manager is further configured to increase or decrease the value of one of the two nodes according to, respectively, a positive or a negative weighing factor.

In either of these embodiments of the system according to the invention, the node value and/or weighing factor is a fuzzy value between 0 and 1.

In an embodiment of the system according to the invention, the nodes of the fuzzy causal network are data structures representative of security concerns (assets, threats, risks, attacks, vulnerabilities, security goals, security requirements, and security controls), and other requirements of the system that can be affected by the security controls.

In a variant of this embodiment, the plurality of nodes and causal links are structured to be indicative of any or all of the impact that changes of an asset have on the value of other assets, which contain or use it; the impact that changes of an asset have on the criticality of the security goals necessary to protect it; the impact that changes of an asset have on the level of threats; the impact that the presence or absence of vulnerabilities have on the probability of attacks; the impact that a security control has on the mitigation of vulnerabilities; the impact that a security control has on the satisfaction of certain security requirements; the impact that the satisfaction level of a security requirement has on the achievement of its corresponding security goal; the impact that the level of a threat has on increasing/decreasing the probability of any attack; and the impact that a security control has on the satisfaction of other functional and/or non-functional requirements.

In another embodiment of the invention there is provided a method to protect variable assets at runtime that adjusts its security controls when assets change or, because of contextual changes, the current configuration of security controls deems ineffective. The method mitigates the security risk by guaranteeing a required security level (where "security level" is the satisfaction degree of security goals (confidentiality, integrity, availability, and accountability)), and satisfying other system requirements, such as performance and usability up to a sufficient level. The method comprises the steps of: (a) defining the security model of the system, (b) generating a fuzzy causal network from the model comprising a plurality of nodes and incoming and outgoing causal links, wherein each node and link correspond to the elements and relationships represented in the security model, where assets and implemented security functions are assigned their respective nodes, (c) updating the nodes corresponding to assets or other security concerns that may be affected by contextual factors to the current value monitored in the controlled application/device, (d) propagating the updated value in the fuzzy causal network through the causal links associated with the updated node, (e) processing the fuzzy causal network to determine the utility of any possible configuration of security controls, (f) selecting the configuration of security functions with the highest utility consisting of a set of security control nodes, (g) and applying the security configuration by activating and/or deactivating corresponding security functions on the controlled application/device.

In one embodiment there is provided the step of defining a security model that represents a set of elements: the assets to be protected, threats, attacks, vulnerabilities, security goals, security requirements, and security controls, the functional and non-functional requirements of the system, together with the contextual factors that might affect them.

In one embodiment the security model represents the relationships among assets, security concerns, functional/non-functional requirements and contextual factors to identify and quantify the impact of a change in one element of the security model on the ones that are related to it.

In one embodiment there is provided a step generating a fuzzy causal network from the elements and relationships represented in the security model in, and whose nodes and links respectively reflect the elements and the relationships represented in the security model.

In one embodiment there is provided a step of associating nodes representing assets and contextual factors with an initial value that affects and adapted to be propagated to the other nodes of the fuzzy causal network.

In one embodiment each node of the fuzzy causal network has an initial value and the step of propagating the value of the updated nodes in the fuzzy causal network and further comprising updating the value of each node, by aggregating the respective values of one or more nodes associated with its incoming links.

In one embodiment there is provided a step of aggregating each value of the nodes of the fuzzy causal network is performed according to a specific function selected from the group comprising min, max, sum, average functions.

In one embodiment each link of the fuzzy causal network comprises a weighing factor indicative of the strength of the causal relationship between two nodes at respective ends of the link, and the step of propagating the value of the updated nodes in the fuzzy causal network further comprises increasing or decreasing the value of the ending node of the link according to, respectively, a positive or a negative weighing factor.

In one embodiment a node value and/or a weighing factor of the fuzzy causal network is a fuzzy value between 0 and 1 with specific semantics.

In one embodiment there is provide a step of assigning partial security risks, a total security risk and a utility of security functions to respective nodes in the fuzzy causal network.

In one embodiment each partial security risk node is indicative of the risk associated with a respective attack, and the step of processing the fuzzy causal network further comprises processing the value of the total security risk node, by aggregating the respective values of all partial security risk nodes.

In one embodiment the utility node is indicative of the utility of a security configuration, and the step of processing the fuzzy causal network further comprises processing the value of the utility node, by aggregating a set of parameters representative the value of the risk node, the satisfaction of security goals and the impact of the enabled configuration of security controls on the other functional and non-functional requirements of the system.

In one embodiment there is provided the step of associating security functions having nodes in the fuzzy causal network with respective security controls implemented in the application and/or device under control.

In a further embodiment there is provided a system for adapting a security configuration in a controlled application/device at run-time to mitigate security risk by guaranteeing a required security level and accountability, and satisfying other system requirements, such as performance and usability up to a sufficient level.

In one embodiment the system of the invention generates a fuzzy causal network from the security model comprising a plurality of nodes and incoming and outgoing causal links, wherein each node and link correspond to the elements and relationships represented in the security model, where assets and contextual values and implemented security functions are assigned their respective nodes; and an adaptive security manager comprising means to monitor the current value of assets or contextual factors, means to assign a security function implemented in the controlled system/device to a security control node of the fuzzy causal network, wherein the adaptive security manager is configured to update the node corresponding to an asset or a contextual factor with the determined current value, propagate the updated value in the fuzzy causal network through causal links associated with the updated node, process the fuzzy causal network to determine the utility of any security configuration consisting of an alternative set of security control nodes, select the security configuration with the highest utility, and implement it in the controlled application/device by activating and/or deactivating the security functions corresponding to the security controls nodes enabled in the selected security configuration.

In one embodiment the security level is defined as the satisfaction degree of security goals, such as confidentiality, integrity, availability.

In one embodiment the adaptive security manager further comprises means to monitor assets and contextual factors of the controlled application/device.

In one embodiment the means to monitor the assets value is an asset monitoring module and the means to monitor the factors representative of the context of the controlled application/device is a context monitoring module.

In one embodiment each node has an initial value and the adaptive security manager is further configured to aggregate the respective values of one or more nodes associated with its incoming links according to a specific function selected from the group comprising min, max, sum, average functions.

In one embodiment the casual network is adapted to be plugged in any application/device to apply a set of security functions depending on the value of the assets and the context.

In one embodiment the system is adapted to update the value of assets and context nodes of the fuzzy causal network by using the data collected by the assets and context monitoring modules, respectively.

In one embodiment the system propagates the value of the changed nodes of the fuzzy causal network through the links of the causal network.

In one embodiment the system is adapted to evaluate the utility of any configuration of security controls of the fuzzy causal network, selects the configuration with the highest utility, and applies the security functions associated with the security control nodes in the selected security configuration to the controlled application/device.

For any of the above embodiments and further variants, any in the plurality of data communication devices may selected from the group comprising computers, portable computers, tablet computers, mobile telephone handsets.

According to yet another aspect of the present invention, there is also provided a set of instructions recorded on a data carrying medium which, when processed by a data processing terminal connected to a network, configures the terminal to perform the steps of the method substantially as described above.

According to still another aspect of the present invention, there is also provided a set of instructions recorded on a data carrying medium which, when processed by a data processing terminal connected to a network, configures the terminal as the system substantially as described above.

The set of instructions may be advantageously embodied as an application package file ('APK') for use with the Android™ operating system or embodied as an iPhone™ application archive ('IPA') for use with the iOS™ operating system.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
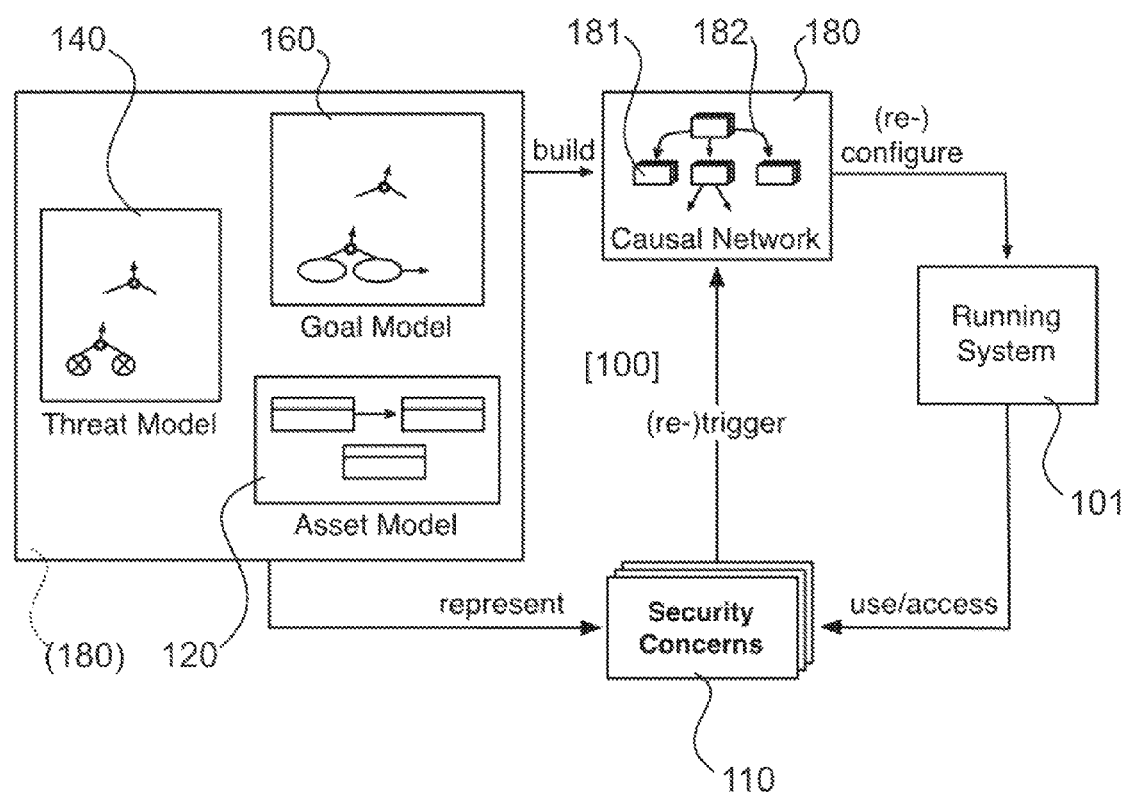
FIG. 1 is a functional representation of a data processing architecture according to the invention, including asset, goal and threat data models and a fuzzy causal network.

The adaptive security architecture 100 of the invention considers application variables embodying assets as first-class entities in development and operation of secure software systems. As shown in FIG. 1, the security models represent security concerns 110 along with the other requirements of a system 101. In particular, asset, threat and goal models 120, 140, 160 are implemented. The asset model 120 represents assets under protection and their relationships, wherein each asset is linked to the threats and security goals that can harm and protect it, respectively. The threat model 140 represents threats and decomposes them into known and potential attacks. The goal model 160 extends the KAOS goal model to represent security goals, requirements and controls, together with other functional and non-functional requirements of the system. In the goal model 160, vulnerabilities are explicitly represented, which may be brought by domain assumptions or system operations. Vulnerabilities are related to the attacks they facilitate and to the security controls by which they are mitigated. Contextual factors that can cause changes in the asset, threat and goal models 120, 140, 160 are also represented.

Figure 10:
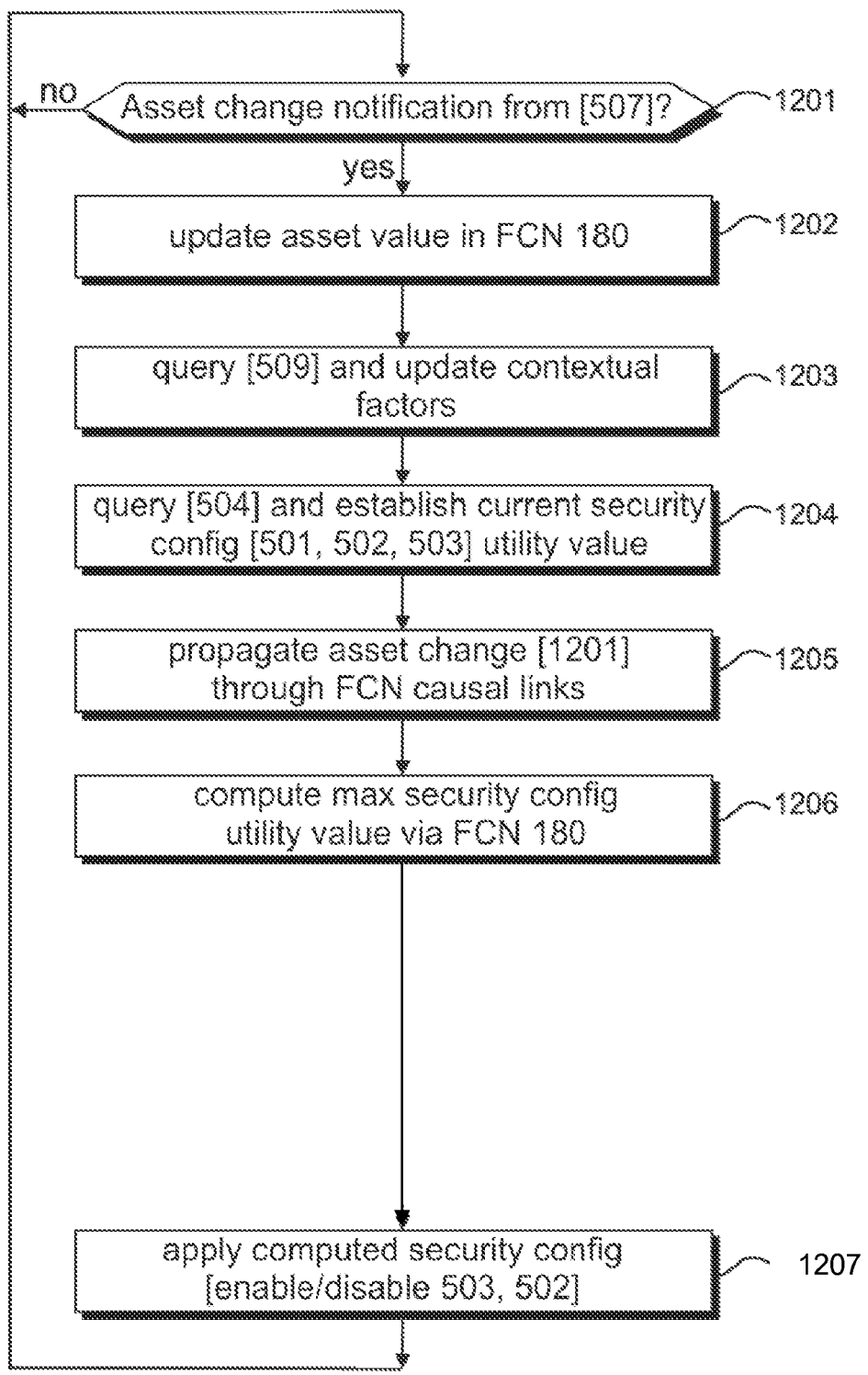
FIG. 10 details data processing steps of an embodiment of the method performed by the embodiments of FIGS. 3 and 4, performed at runtime.

The elements and relationships expressed in the asset, threat, and goal models 120, 140, 160 are used to create nodes 181 and connections 182 of a fuzzy causal network 180, described in further detail hereafter with reference to FIGS. 10 and 11. Each node 181 in this network 18 has a different semantics, depending on the security concern it is associated with. For example, a node 181 associated with a vulnerability represents its presence. The links 182 of the network 180 identify positive and negative causal relationships among security entities. For example, the positive link between a vulnerability (V1) and an attack (At1) has the following interpretation: an increased probability of V1 causes an increase in the probability of success of At1. The fuzzy causal network 180 also adds the concepts of risk and utility. Risk nodes are used to compute the security risk by aggregating the partial risk of each attack. The utility node computes the benefits of a specific configuration of security controls, when assets and vulnerabilities have a certain value.

Security concerns may change dynamically. For example, the value of asset application variables can be changed, and new vulnerabilities can be introduced by context modifications. These modifications are propagated onto the causal network by updating the value of its nodes 181 and/or its structure 180. Analysis is triggered after a change takes place, in order to re-calculate new utility values for all applicable configurations of security controls. The most appropriate set of security controls, exhibiting the highest utility, is selected and applied onto the running system.

Figure 3:
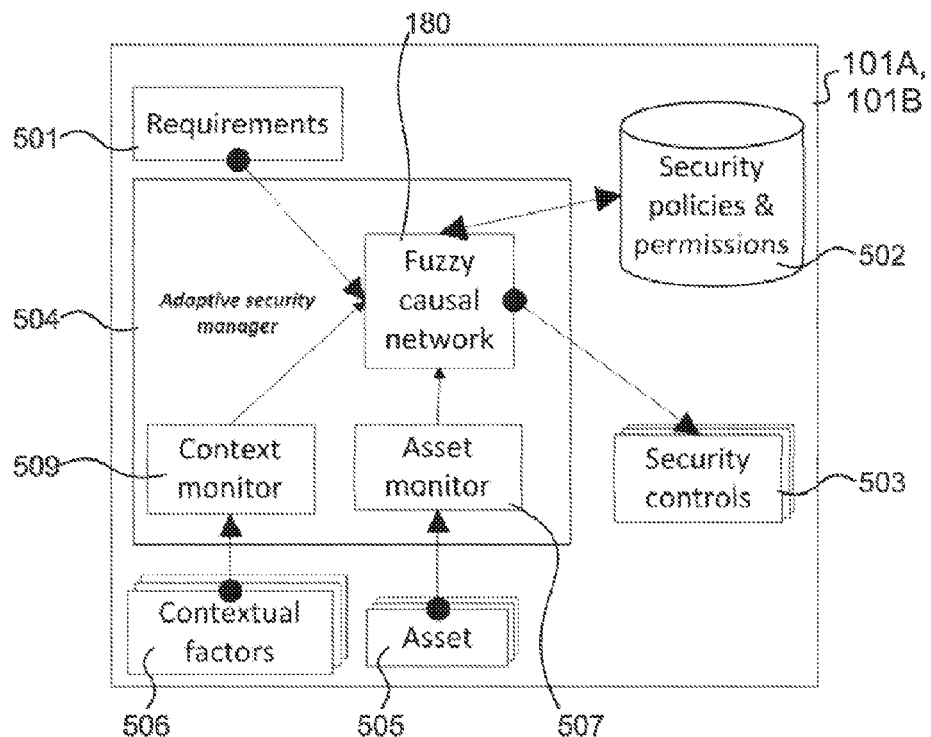
FIG. 3 shows a first embodiment of the architecture of FIG. 1, wherein the architecture is local. The adaptive security manager can be deployed in a mobile (e.g., smart phone) or fixed system (e.g., smart home)

A first embodiment of the architecture 100 is shown in FIG. 3, wherein the architecture is implemented locally within a data processing terminal or computing unit 101A, 101B. Requirements 501 include all the functional and non-functional requirements of the system 101. Security policies and permissions 502 limit the search space for the FCN 180 in finding a most appropriate security configuration, and security controls 503 are data processing functions apt to enforce the policies and permissions 502. For example, a security policy and/or control may be specified as permanently-enabled and cannot be switched off, because of device performance or usability concerns.

An adaptive security manager 504 determines a security configuration for the terminal 101A, 101B, based on the requirements 501, the security policies 502, available security controls 503, changes in assets 505 and/or their respective values, and changes in contextual factors 506. An asset monitoring module 507 of the adaptive security manager 504 monitors changes in assets 505 and/or their respective values, and a context monitoring module 509 of the security manager 504 monitors changes in contextual factors 506. The requirements 501 and the respective output data of the asset and context monitoring modules 507, 509 are input to the Fuzzy Causal Network (FCN) 180. Assets 505 are valuable information, and this information can be added to and removed from the terminal 101A, 101B, and asset values can change due to contextual variability, for instance spatio-temporal changes. Depending on these changes, the FCN 180 selects an appropriate security configuration for policies 502 and controls 503. For example, a stronger or weaker password policy might be put in place or a specific encryption setting might be applied.

It will be readily understood by the skilled person that the principles described above and herein are equally applicable to many other environments combining assets, threats and goals and, accordingly, configurable security policies. For instance, the adaptive security manager monitors assets in a smart home. When assets are added-including people, valuable objects, cash, and information about tenants and their behaviors—the system adjust security controls and policies. For example, the energy management system may change the security configuration depending on who is in the house at a certain time.

Figure 2:
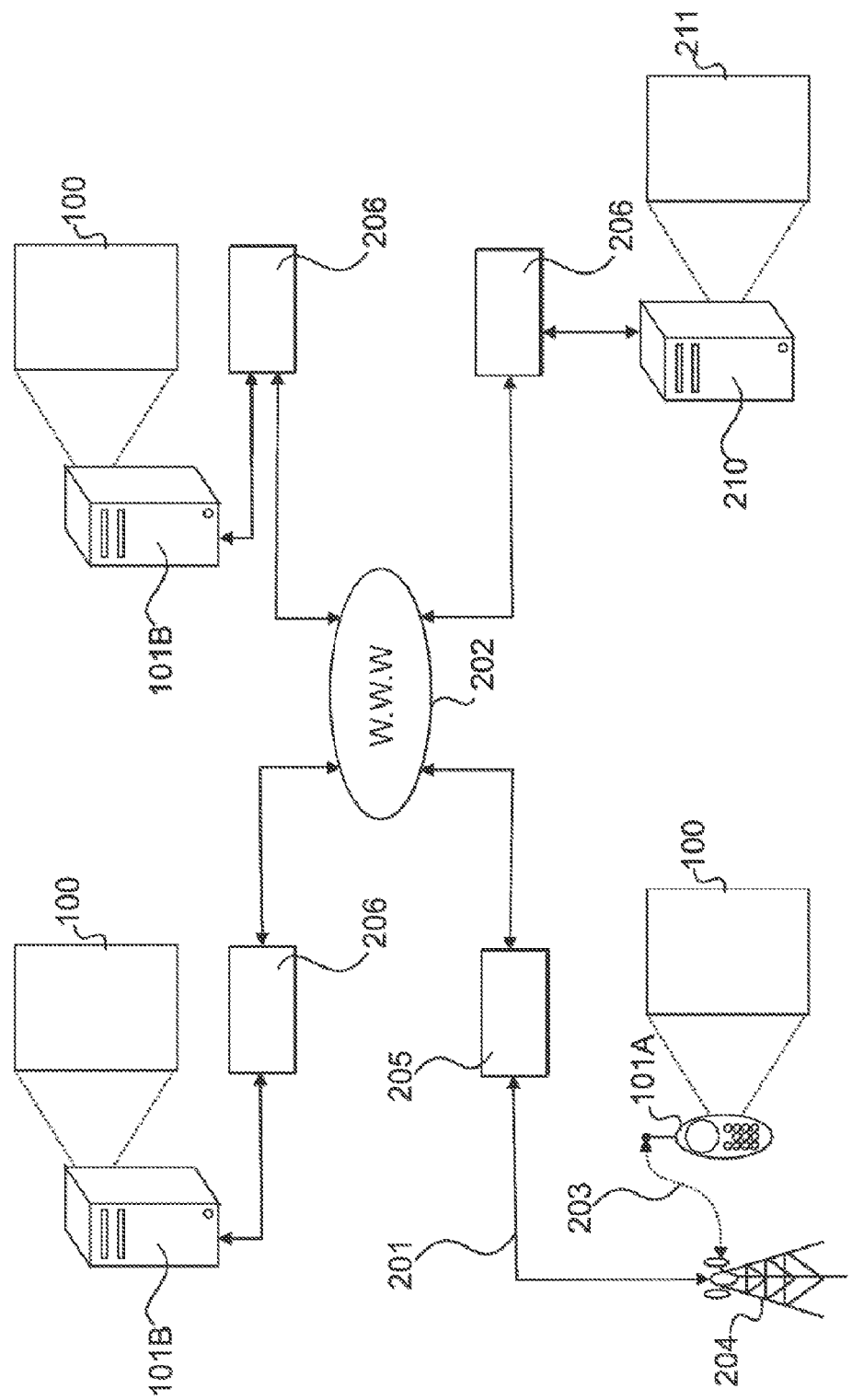
FIG. 2 shows a network environment comprising a plurality of communication networks, mobile and static data processing terminals, wherein the architecture of FIG. 1 may be practiced at one or more of the terminals, locally or in distributed form.
Figure 4:
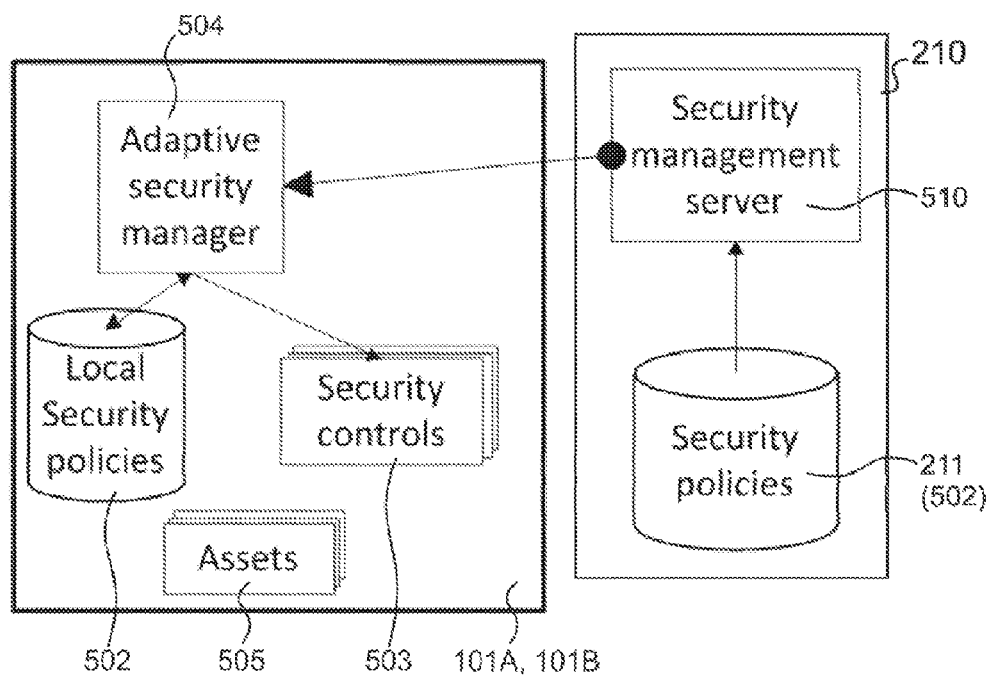
FIG. 4 shows a second embodiment of the architecture of FIG. 1, wherein there are external security policies enforced by one or more servers in the surrounding environment (e.g., a personal mobile phone taken to an organization, which has specific security policies for protecting sensitive information)

FIG. 4 illustrates an embodiment of the system in which an external or remote security manager 510, for instance at the security server 210 in the environment of FIG. 2, enforces its security policies 211, 502. The system in this case may for instance be a mobile device 101A entering an office and the server 210 tries to enforce required policies 211, 502. It is also possible that the system is a fixed device or appliance 101B, and the security server 210 enforces new policies 211 for any reason. In these cases, the Fuzzy Causal Network 180 in the adaptation manager 504 considers these external policies 211 as constraints in adjusting the security configuration.

Figure 5:
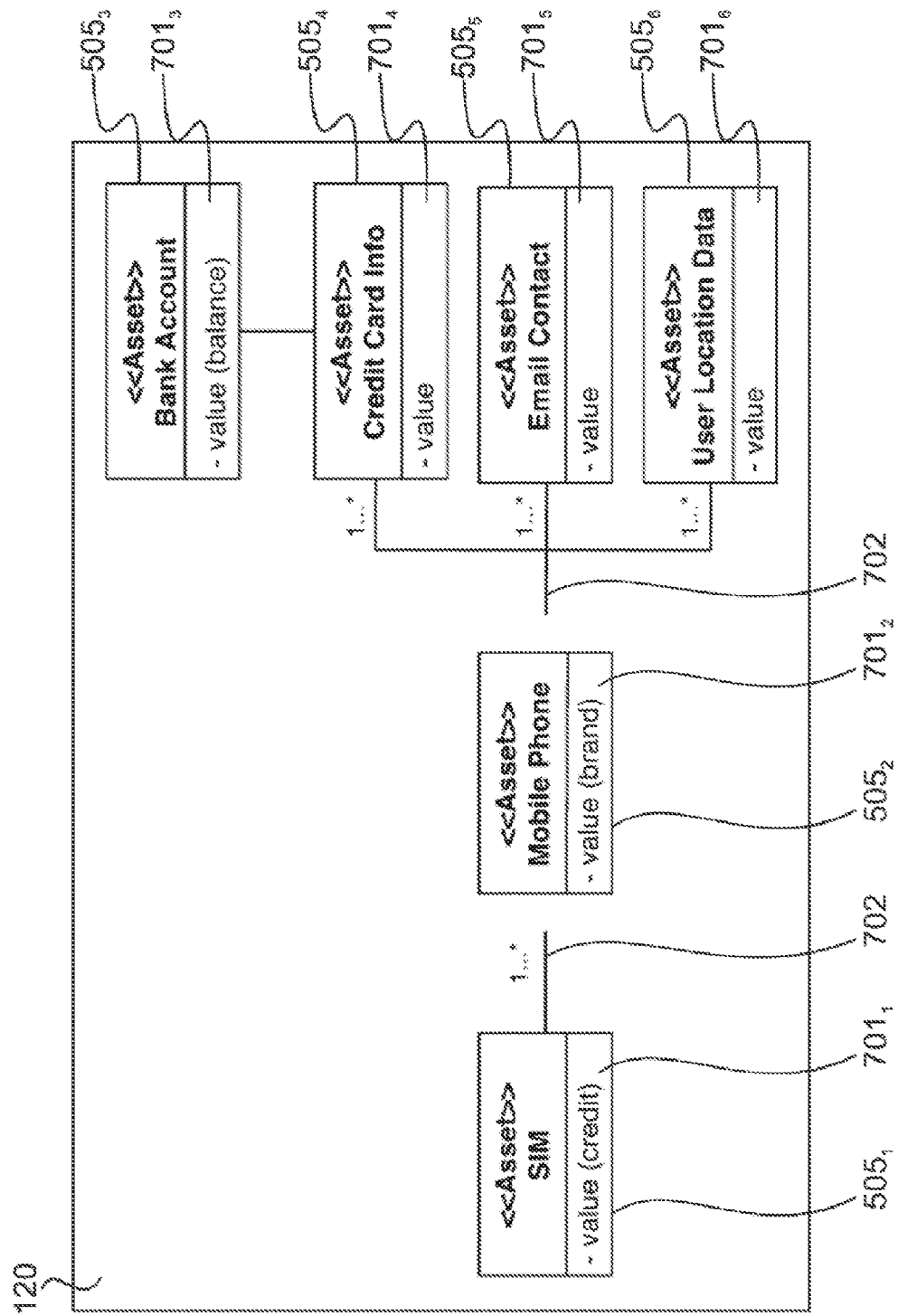
FIG. 5 illustrates an embodiment of the asset model of FIGS. 1, 3 and 4.

An example asset model 120 is shown in FIG. 5. In the case of a mobile terminal 101A, the assets $505_N$ include the mobile phone 101A itself, the SIM card 316, and other sensitive data, such as credit card, banking data, email addresses and the like. Each asset variable has a respective, nominal or actual data value $701_N$. For instance the SIM value $701_1$ may be a monetary value representative of call credit available, the phone value $701_2$ may be a descriptive value representative of the device make and/or model, and so on and so forth. Assets $505_N$ that are related 702 to the mobile phone 101A in the model, such as SIM and credit card information $701_1$, $701_4$, contribute to increase the phone value $701_2$. Attacks that target the mobile phone 101A (for instance, theft of the phone) itself may harm the related assets $505_N$ as well. Attacks that target credit card information $701_4$ may also harm the bank account $505_3$.

Figure 6:
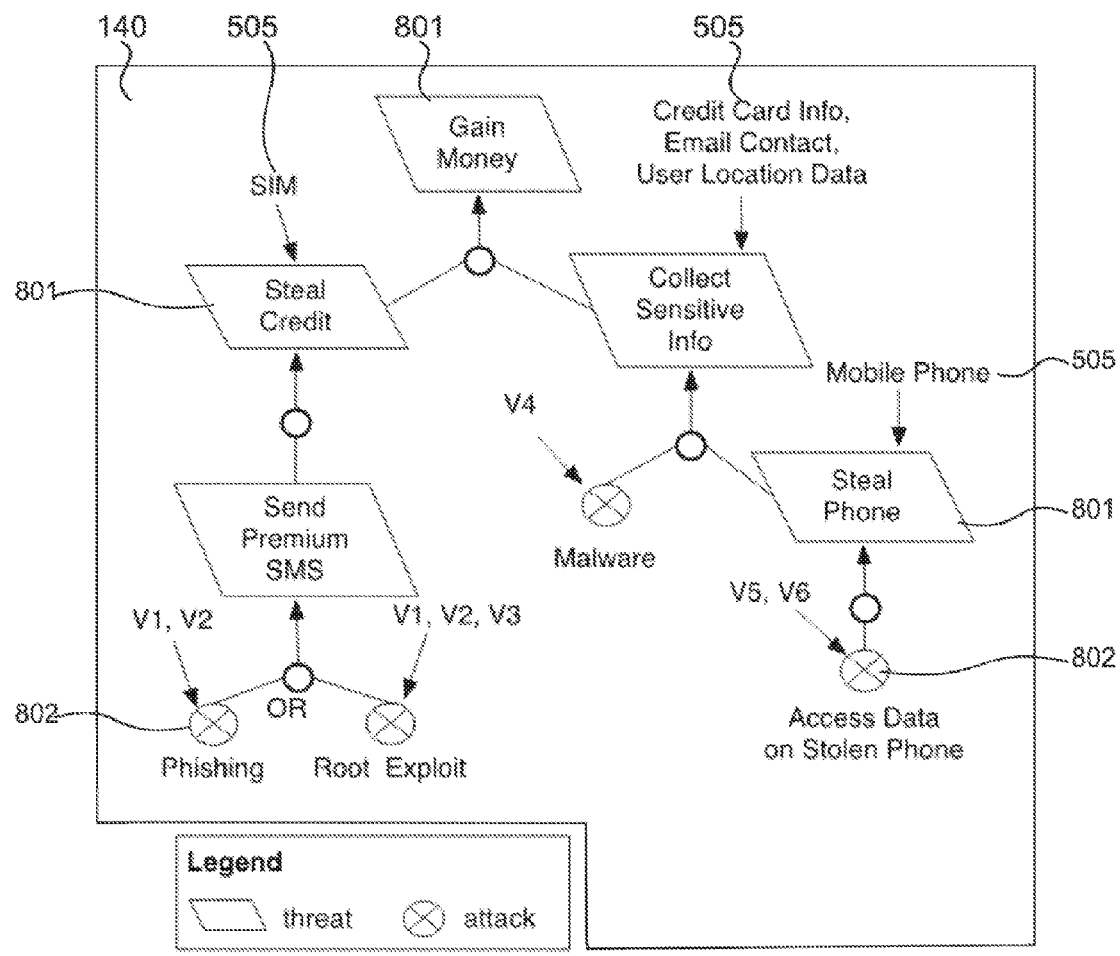
FIG. 6 illustrates an embodiment of the threat model of FIGS. 1, 3 and 4.

Next, an example threat model 140 is shown in FIG. 6. Threat goals 801 represent motivations of threat agents to attack a system 101A, 101B. Each threat 801 is decomposed into sub-threats 801, until the concrete attacks 802 that should be performed to achieve that threat are detected. For the mobile phone example, the top goal 801 of an attacker can be monetary gain ("Gain Money") that can be achieved by stealing 802 the phone credit ("Steal Credit") or collecting 802 sensitive information from the mobile device ("Collect Sensitive Info"). Phone credit $701_1$ may be stolen, by persuading the victim to send premium SMS (801), for instance via "Phishing" or "Root exploit" attacks. Threats 801 are associated with the assets 505 they can harm. For example, a "Steal Credit" threat 801 can harm the "SIM" asset 505. Attacks 802 are also related to the vulnerabilities $V_N$ they exploit. For example, an absence of encryption $V_5$ facilitates an "Access Data on Stolen Phone" attack 802.

Figure 7:
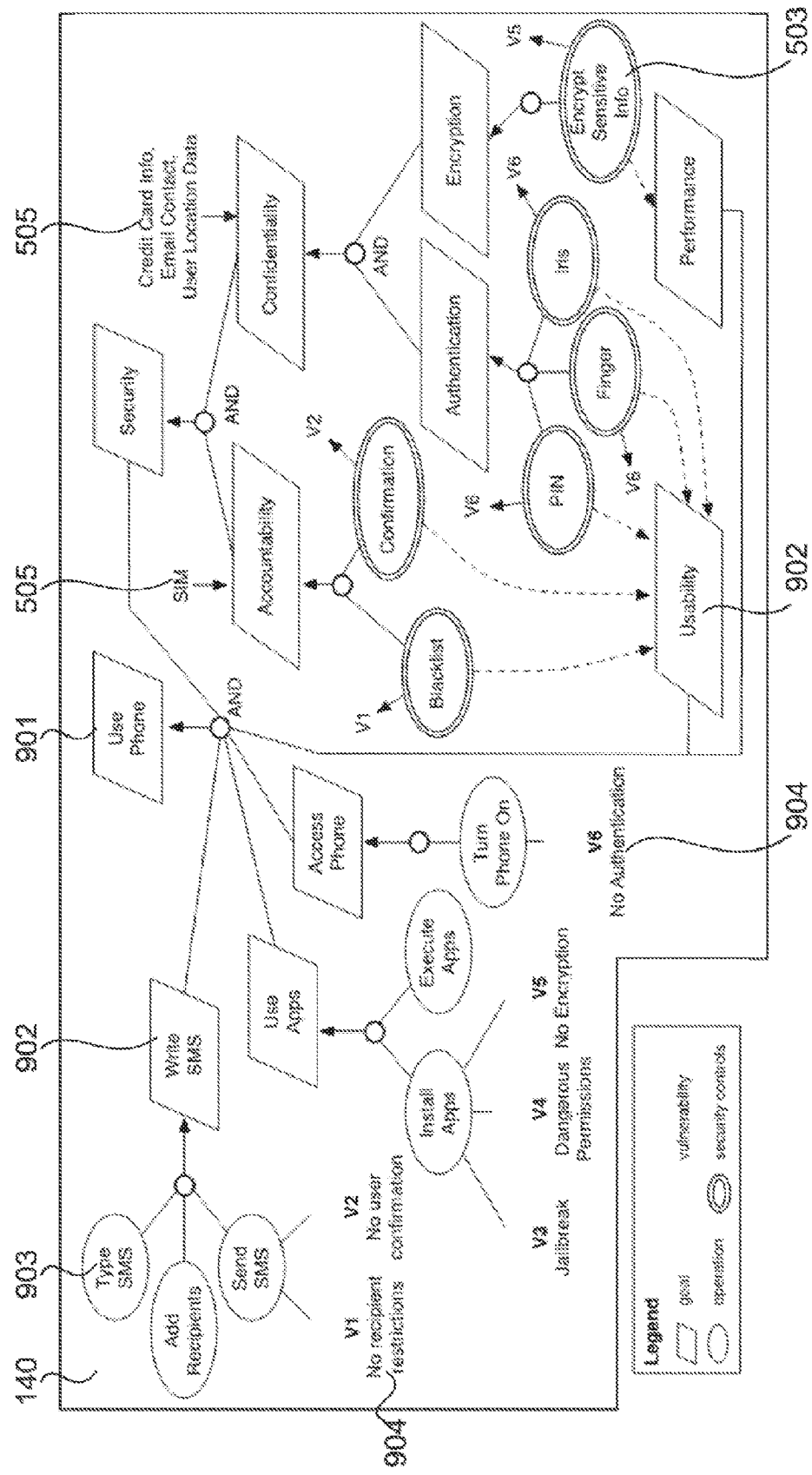
FIG. 7 illustrates an embodiment of the goal model of FIGS. 1, 3 and 4.

Next, an example goal model 160 is shown in FIG. 7. The goal model 160 represents the main requirements 901 which a system 101A, 101B must satisfy or maintain, and decomposes them into functional and non-functional sub-requirements 902. For example, main requirement "Use Phone" 901 is decomposed into functional sub-requirements 902 ("Write SMS", "Use Apps" and "Access Phone") and non-functional sub-requirements 902 ("Usability" and "Performance").

Each requirement and/or sub-requirement 901, 902 is associated with respective operations 903 which must be performed in order to attain the goal(s). Thus, to use (901) mobile applications, it is necessary to perform the following operations 903: "Install Apps" and "Execute Apps". The operation "Install Apps" 903 can introduce vulnerabilities ($V_N$) 904 to the system, such as no encryption of data in the device (V5) and or a root exploit (V3), also called a "jailbreak".

Security goals 901 have a hierarchical structure and can be gradually decomposed into sub-requirements 902 and eventually security controls 503, per the above logic. For example, preventive security controls 503 are prioritized, which avoid attempts to deny security goals 901. "Accountability" and "Confidentiality" may therefore be considered sub-requirements 902 of the main security goal 901, and are associated with the assets 505 they protect, such the "SIM" and "Credit Card Information", respectively. To achieve confidentiality (902), the following security sub-requirements 902 should be enforced: "Authentication" and "Encryption". Encryption is achieved through security control "Encrypt Sensitive Info" 503, which mitigates vulnerability V5 but can also have a side-effects on other requirements, such as data processing performance for instance.

Figure 8:
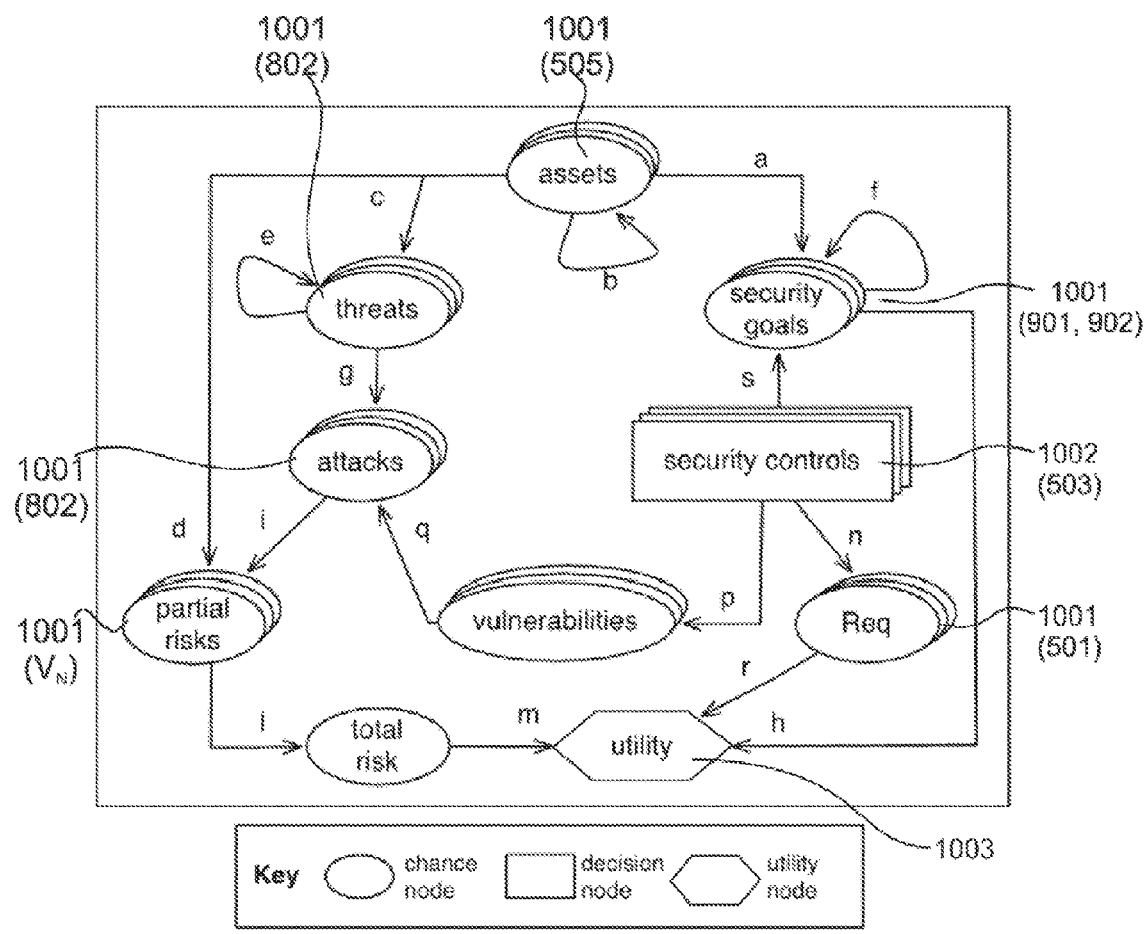
FIG. 8 is a functional representation of the fuzzy causal network of FIGS. 1, 3 and 4.

A functional representation of the causal network structure 180 of the invention is shown in FIG. 8. The causal network 180, also called Fuzzy Causal Network (FCN) is built upon the elements 505, 701, 702, 801, 802, 901 to 905 and their links represented in the asset, goal, and threat models 120, 140, 160. Similar to an influence diagram, the causal network 180 has three types of nodes: chance nodes 1001 representing security concerns significant for causal reasoning (oval in the diagram), decision nodes 1002 indicating the security controls 503 to be selected (rectangle in the diagram), and at least one utility node 1003 (hexagon in the diagram). The table below lists typical nodes of the FCN 180 by definition (type), cognitive meaning (meaning) and output (type). Save as to the at least one utility node 1003, all other nodes are represented by a respective fuzzy variable in the range [0, 1], since in many cases their value is not precisely known.

| Node | Meaning | Type |
|---|---|---|
| Asset (As) | Value | Chance |
| Threat (T) | Threat level | Chance |
| Attack (At) | Probability of success | Chance |
| Security goal (SG) | Satisfaction level | Chance |
| Vulnerability (V) | Presence of vulnerability | Chance |
| Non-Functional Requirements (NFR) | Satisfaction level | Chance |
| Partial Risk (PR) | Partial risk of an attack | Chance |
| Total Risk (TR) | Risk of all attacks | Chance |
| Security Control (SC) | Strength | Decision |
| Utility (U) | Value | Utility |

The structure of the FCN 180 comprises links 1004 labeled with a weight, which represents the strength of the causal relationship between two nodes of the network. A positive weight means that increasing the value of a node increases the value of the node at the other end of the link, whereas a negative weight means that increasing the value of the node decreases the value of the node at the other end of the link. A high or low weight for a positive or negative causal link, means that an increase of the value of the node may cause a correspondingly great or small increase or decrease of the value of the node at the other end of the link. Weights may have a value in the range [0, 1]. For example, a negative weight between a security control 503 and a vulnerability 904 states that the security control 503 mitigates the corresponding vulnerability 903. Assigning precise weights to the FCN 180 requires high domain knowledge. The FCN 180 is an acyclic graph, the loops of which may only exist between different chance nodes 1001, e.g., between two assets 505 such as "Credit Card Info" and "Mobile".

Figure 9:
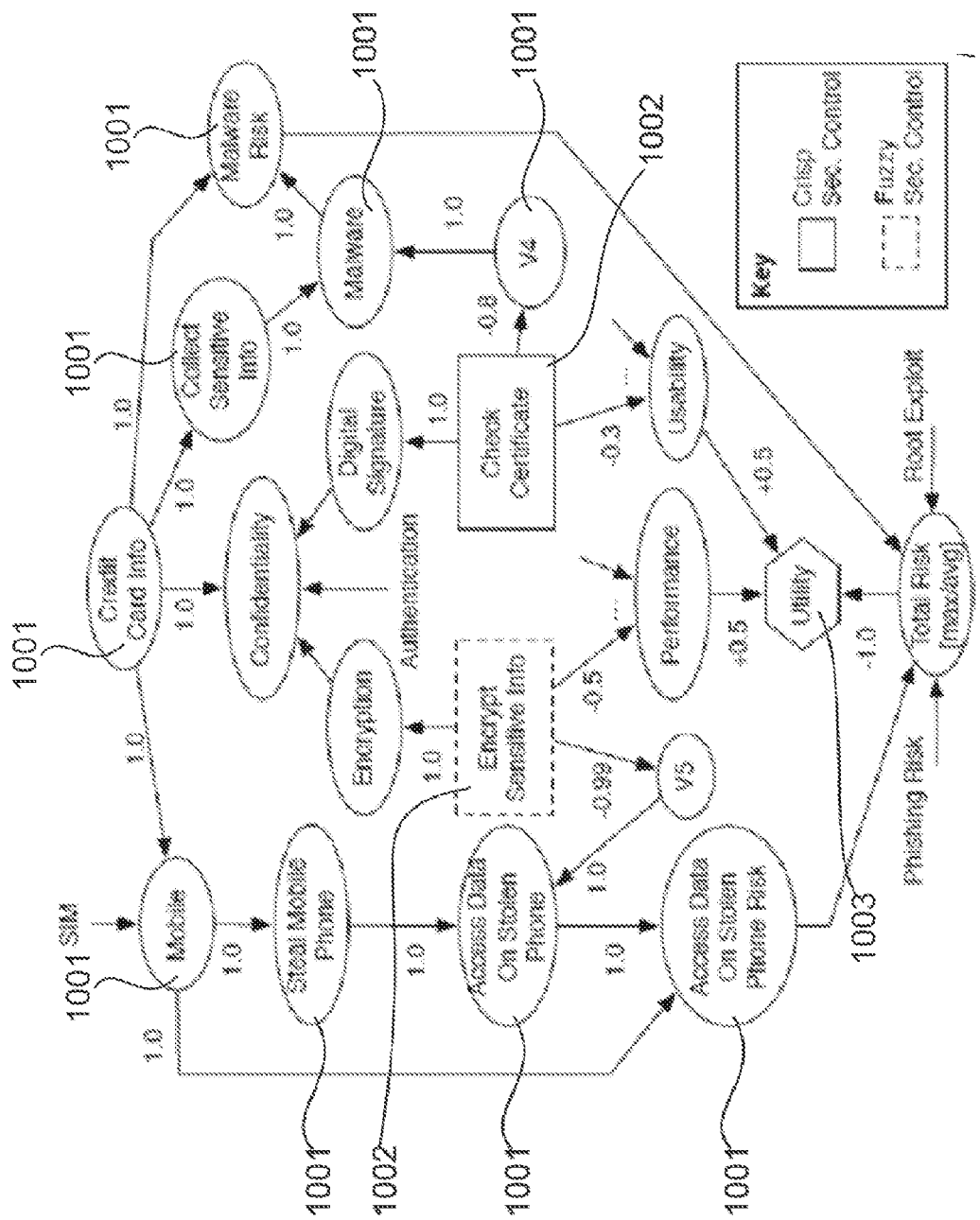
FIG. 9 is a functional representation of the fuzzy causal network of FIG. 8.

An embodiment of the causal network structure 180 of the invention is shown in practice in FIG. 9, as applied to the example of FIG. 2. Chance nodes 1001 are defined based on entities essential for adaption, i.e. assets 505, threats 801 and attacks 802. For each attack node 1001, a partial risk node 1001 is added to the network 180. For example, nodes "Malware Risk" and "Access Data on Stolen Phone Risk" 1001 are partial risks. The FCN 180 is also augmented with the total risk node 1001 and utility node 1003. The total risk node 1001 aggregates all partial risks 1001, whereas the utility node 1003 aggregates a set of costs and benefits. Benefits depend on how many security controls 503 can mitigate the risk, and costs indicate how much the many security controls 503 affect or otherwise impact system requirements 501. The risk and requirement nodes 1001 have a negative impact on the utility node 1003, whereas security goals 1001 have a positive impact.

The FCN 180 is set to analyze the impact of variability in assets 505 on security, particularly risk, and select the most appropriate security controls 503 to manage the risk change at runtime. The analysis and decision-making are performed using causal reasoning on the FCN links. Each node 1001 in the FCN needs to aggregate causal effects from input links. This may be different for each node, depending on the attributed semantics.

Aggregation functions can be Minimum, Maximum, Average and Sum. The Sum function is selected for the utility node 1003, since it is not a fuzzy variable and accumulates the contributions coming from the total risk, requirements and security goals nodes 1001. For all the other nodes, selecting one of the other three functions indicates how much the output should be weighted based on inputs. The Maximum function is more conservative, because if Maximum is used to aggregate causal effects of several assets 505 to a specific asset 505, security controls 503 may be overweighed. Average is selected for this purpose, to adopt a middle level between conservative and relaxing aggregations. Aggregating functions are applied after applying weights to each input, whereby the input-output mapping can be adjusted by tuning the weights. To evaluate the partial risk, the loss factor (asset contribution) is multiplied by the probability of attack, which is translated into the Minimum function. For aggregating partial risk to total risk, the Maximum function is used to add up partial risks.

The nodes and weights on causal links are firstly initialized. As noted before, initial values for assets and other components of the FCN 180 may come from stakeholders, domain experts, security requirements artifacts and existing evidence, for instance statistical data. Initial values of security controls 503 are the default security settings that may be adapted at a later time by the FCN 180 at runtime. After any change of security concerns takes place, the FCN 180 is re-evaluated and security controls 503 should be changed if necessary. First, the value of the changed security concerns is updated and then the causal effect through outward links will affect connected nodes 1001, 1002. These effects are propagated through other links towards the utility node 1003. To avoid an infinite update without convergence, a threshold is specified as a convergence criterion: in case the value of a node does not change more than the specified threshold, the computation of the value at that node can terminate. Every time a change takes place, the maximum expected utility needs to specify the best possible configuration for the given network state. For this purpose, different values of decision nodes 1002, i.e. security controls, should be tried. While searching for the best utility would be time-consuming and can be more efficient by applying heuristics, in this proposal a global search is considered for evaluate all possible security controls.

Accordingly, with reference to FIG. 10, at runtime, a first step 1201 is to query whether any change of security concern or asset value has taken place. Data is collected from sensors by the adaptive security manage 504, and its asset and context modules 507, 509, to determine the current value of assets at step 1202, significant contextual factors at step 1203 as well as the current security configuration at step 1204, since the configuration may have been changed manually or by other applications independently of the FCN 180-driven procedure. Collected values are then transferred to the corresponding nodes 1001 in the FCN 180 at step 1205, whereby changes in the nodes are propagated through the network via cause-effect links. In the next step 1206, the reasoning mechanism determines a next security configuration of maximum utility value. Accordingly, the last step 1207 is to apply the determined security configuration by adjusting security controls 503, policies and/or permissions 502.

The present invention thus provides a method of adapting security functions and policies in a data processing application and/or device at run-time. A causal network is used to support both qualitative (e.g., Fuzzy Cognitive Maps) and quantitative (e.g., Bayesian decision networks) analysis and decision-making. A causal network 180 built from the three described models 120, 140, 160 enables analysis of the consequences of asset-relevant changes, and performs the impact analysis of potential decisions. The main challenge is in relation to entities in the three asset, threat and goal models, as quantitative analysis may not be always feasible, due to imprecision of data. For instance, quantitative risk evaluation is challenging, since many threats might be rare or not have happened yet. The present architecture 100 allows for qualitative reasoning based on fuzzy values of entities in the three models 120, 140, 160. This approach is close to linguistic terms and intuitive judgments of domain experts for risk assessment.

The proposed approach uses the artifacts generated by security requirements engineering and risk assessment methods by adding an asset model. This model can also be built and updated using the information and models from asset management systems. Indeed, collecting and defining most of the entities in the FCN 180 is based on the outcome of processes critical businesses follow. The proposed approach integrates these pieces of information to build a dynamic security model, to be used for automated decision making at runtime.

The causal network 180 represents traceability between security controls 503, requirements 501 and assets 505. Therefore, administrators and users can better understand why a certain change is required, and what is the security configuration attempting to protect. Costs and benefits of each security configuration are also analyzed, which are not only useful for adjusting security controls at runtime, but also are useful for system maintenance and evolution.

The proposed approach can also help Chief Security and Information Security Officers (CSO and CSIO) to disable or remove unnecessary security controls. For example, when there is no valuable asset 505 in a building, physical device or a cyber space such as a file or business process, there is no need to assign resources for protecting those entities.

Monitoring assets and analyzing the impact their variability on security concerns can also increase security awareness of users. For example, if the causal network is deployed on a mobile phone 101A then, when storing new information, the system reacts and notifies the applied adjustments to the user. The user might then decide to manage information in a different way, for instance remove some or all of it, or change the modified security configuration.

Although the causal network 180 is designed to be used in a fully automatic adaptive mechanism, it may also be employed in a recommender system. Such a system analyzes impacts of asset changes and only recommends potential adjustments in security controls with their costs and benefits. This approach is useful for highly critical systems whose stakeholders may not trust automated security management.

The FCN architecture enables software engineers to design a system that adjusts its security controls when assets change or, because of contextual changes, the current configuration is eventually deemed ineffective. Applied security controls mitigate the security risk by guaranteeing a required security level, and satisfying other system requirements, such as performance and usability up to a sufficient level. The term "security level" refers to the satisfaction degree of security goals (i.e., confidentiality, integrity, availability and accountability).

The security model complements a model representing a set of security concerns: assets, threats, attacks, vulnerabilities, security goals, security requirements, and security controls. The security model also represents the mutual relationships among security concerns and functional/non-functional requirements to identify and quantify the impact of a change on the other elements of the model. For instance, these relationships can be: between two assets (asset-asset relationship) to indicate the impact that changes of an asset have on the value of other assets, which contain or use it; between an asset and a security goal (asset-security goal relationship) to indicate the impact that changes of an asset have on the criticality of the security goals necessary to protect it; between an asset and a threat (asset-threat relationship) to indicate the impact that changes of an asset have on the threat level; between a vulnerability and an attack (vulnerability-attack relationship) to indicate the impact that the presence/absence of vulnerabilities has on the probability of attacks; between a security control and a vulnerability (security control-vulnerability relationship) to indicate the impact that a security control has on mitigating that vulnerability; between a security control and a security requirement (security control-requirement relationship) to indicate the impact that a security control has on satisfying that security requirement; between a security requirement and a security goal (security requirement-security goal relationship) to indicate the impact that the satisfaction level of a security requirement has on the achievement of the corresponding security goal; between a threat and an attack (threat-attack relationship) to indicate the impact that the level of a threat has on increasing/decreasing the probability of the related attack; between a security control and another functional/non-functional requirement (security control-requirement relationship) to indicate the impact that a security control has on the satisfaction of the related functional/non-functional requirement.

The nodes and links of the FCN (Fuzzy Causal Network) respectively reflect the elements and the relationships represented in the security model. Each node is associated with a value comprised between 0 and 1 with a specific semantics. For example, a node associated with an asset represents its value, while a node associated with a vulnerability represents its presence. The links of the network identify positive and negative causal relationships among security entities. For example, the positive link between a vulnerability (V1) and an attack (At1) means that the presence of V1 causes an increase in the probability of At1. The value of each node is computed by aggregating, according to a specific function (e.g., max, sum, average), the value of the nodes associated with its incoming links. All nodes representing assets and vulnerabilities are associated with an initial value that affects and is propagated to the other nodes. The FCN also includes additional nodes to compute the partial risk, the risk, and the utility of security controls. Each partial risk node represents the risk associated with each attack and the risk node aggregates the contribution of all partial risks. The utility node computes the utility of a specific security configuration, when assets and vulnerabilities have a certain value. It sums the positive contributions coming from the nodes associated with security goals, and the negative contributions coming from the risk and requirements that might be harmed when the selected configuration is applied.

The adaptive security manager leverages the FCN and can be plugged in any application that manages critical assets, to support adaptive security. It monitors assets, contextual factors and other security concerns via the asset and context monitoring modules provided in the system. It analyzes each node in the FCN by updating changed nodes and propagating the causation effects through the network. It selects the configuration of security controls having the highest utility and applies the selected security configuration to the system by adjusting security controls, policies, and/or permissions. To this aim, all security controls 503 represented in the security model should be associated with a specific security function implemented in the software application and/or device under control. This way, when a configuration of security controls is detected, the corresponding security functions can be automatically applied on the system and/or device under control.

Usefully, the adaptive security architecture can be used to protect any kind of assets, be they physical or cyber-physical. The security model can be applied to any asset, as it just describes an asset in terms of its value and its impact on the other assets in the system boundary. Similarly, the causal network does not take into account the asset type, as the value of any asset is conceived as a fuzzy value between 0 and 1. The whole approach is independent from the adopted asset and context monitoring modules, as they should be properly set-up depending on the specific application embodiment. Accordingly, the proposed method and system is applicable in different domains, such as smart buildings and mobile security management. For example, in a smart building, home or office, a variety of virtual and physical assets (such as physical appliances, energy and metering data) can be monitored and protected by this approach. As regards mobile security, the approach helps protecting valuable information assets stored in the mobile device and used by its apps, while reducing costs and providing an acceptable performance and power consumption.

Advantageously, the proposed method and system is independent from the application domain. As noted above, the adaptive security architecture is asset-independent and the security control system can be plugged in any application embodiment. In particular, the data coming from the asset and context monitoring modules must be mapped to the corresponding nodes in the causal network that must be updated. While, to applying a security configuration on the controlled application and/or device requires a mapping between the security controls and the security functions implemented in the controlled application/device. The impact analysis of asset and contextual changes and decision making only rely the causal network and, for this reason, they are independent from the controlled application/device.

The adaptive security manager automatically re-configures the security functions provided by the application/device under control, when assets and other security concerns change. Other activities of adaptive security manager are configured depending on the security model, the causal network, the asset and context monitoring modules and do not need any human intervention.

The adaptive security manager privileges configurations of security controls that have a reduced impact on the other functional and non-functional requirements of the system. This is due to the fact that, as noted above, the utility node of the causal network is evaluated by taking into account the negative contribution of the other functional and non-functional requirements that can be harmed by the evaluated configuration of security controls. Indeed, since the configuration of security controls with the highest utility is selected, their impact on the other requirements of the system is small.

The adaptive security manager applies the security controls that reflect the risk and the value of the assets to be protected, because the causal network computes the utility by taking into account the impact of the satisfaction of the security goals and the risk. An increase in the asset value can increase both the risk and the criticality of the security goals, however the configuration of security controls with the highest utility is selected as the value of the assets increases, thus more effective countermeasure are selected to guarantee the satisfaction of more critical security goals, and reduce a higher risk.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A computer-implemented method of adapting a security configuration in a data processing application processed by a data processing device, wherein the adaptation is based on changes of assets associated with the security configuration and/or factors representative of the context of the data processing application, the computer-implemented method comprising the steps of:
    storing a fuzzy causal network comprising a plurality of nodes and a plurality of incoming and outgoing causal links associated therewith, wherein at least application variables and security functions are assigned respective nodes,
    determining a current value of at least one application variable,
    determining a current security configuration as a set of security function nodes,
    updating the node corresponding to the at least one variable with the determined current value,
    propagating the updated value through the fuzzy causal network through at least one causal link associated with the updated node,
    processing the fuzzy causal network to determine a next security configuration consisting of an alternative set of security function nodes; and
    implementing the next security configuration by activating and/or deactivating corresponding security functions.

2. A method according to claim 1, wherein each node has an initial value and the step of processing the causal network further comprises processing the value of each node, by aggregating the respective values of one or more nodes associated with its incoming links.

3. A method according to claim 2, wherein the step of aggregating is according to a specific function selected from the group comprising min, max, sum, average functions.

4. A method according to claim 1, wherein each link comprises a weighing factor indicative of the strength of the causal relationship between two nodes at respective ends of the link, and the step of propagating further comprises increasing or decreasing the value of one of the two nodes according to, respectively, a positive or a negative weighing factor.

5. A method according to claim 2, wherein a node value and/or a weighing factor is a fuzzy value between 0 and 1.

6. A method according to claim 1, wherein partial security risks, a total security risk and a utility of security functions are assigned respective nodes in the causal network.

7. A method according to claim 6, wherein each partial security risk node is indicative of the risk associated with a respective application or device attack, and the step of processing the causal network further comprises processing the value of the total security risk node, by aggregating the respective values of all partial security risk nodes.

8. A method according to claim 6, wherein the utility node is indicative of the utility of a security configuration, and the step of processing the causal network further comprises processing the value of the utility node, by aggregating a set of parameters representative of security functions required to mitigate the risk and performance impact of the required security functions.

9. A method according to claim 1 comprising the further step of associating security functions having nodes in the causal network with respective security controls implemented in the application and/or device.

10. A system for adapting a security configuration in a data processing application processed by a data processing device, comprising
    a causal network having a plurality of nodes and a plurality of incoming and outgoing causal links associated therewith, wherein at least application variables and security functions are assigned respective nodes; and
    a security manager comprising
    means to determine a current value of at least one application variable,
    means to determine a current security configuration as a set of security function nodes,
    wherein the security manager is configured to update the node corresponding to the at least one variable with the determined current value, propagate the updated value through the causal network through at least one causal link associated with the updated node, process the causal network to determine a next security configuration consisting of an alternative set of security function nodes, and implement the next security configuration by activating and/or deactivating corresponding security functions.

11. A system according to claim 10, wherein the security manager further comprises means to determine factors representative of the context of the data processing application.

12. A system according to claim 11, wherein the means to determine a current value of at least one application variable is an asset monitoring module and the means to determine factors representative of the context of the data processing application is a context monitoring module.

13. A system according to claim 10, wherein each node has an initial value and the security manager is further configured to aggregate the respective values of one or more nodes associated with its incoming links according to a specific function selected from the group comprising min, max, sum, average functions.

14. A system according to any of claim 10, wherein each link comprises a weighing factor indicative of the strength of the causal relationship between two nodes at respective ends of the link, and the security manager is further configured to increase or decrease the value of one of the two nodes according to, respectively, a positive or a negative weighing factor.

15. A system according to claim 10, wherein a node value and/or a weighing factor is a fuzzy value between 0 and 1.

16. A system according to any of claim 10, wherein the application variable and security function nodes of the causal network are data structures representative of assets, threats, risks, attacks, vulnerabilities, security goals, security requirements and security controls.

17. A system according to claim 16, wherein the plurality of nodes and causal links are structured to be indicative of any or all of the impact that changes of an asset have on the value of other assets, which contain or use it; the impact that changes of an asset have on the criticality of the security goals necessary to protect it; the impact that changes of an asset have on the level of threats; the impact that the presence or absence of vulnerabilities have on the probability of attacks; the impact that a security control has on the mitigation of vulnerabilities; the impact that a security control has on the satisfaction of certain security requirements; the impact that the satisfaction level of a security requirement has on the achievement of its corresponding security goal; the impact that the level of a threat has on increasing/decreasing the probability of any attack; and the impact that a security control has on the satisfaction of other functional and/or non-functional requirements.

18. A system according to any of claim 10, wherein the data processing device is selected from the group comprising computers, portable computers, tablet computers, mobile telephone handsets.

19. A set of instructions recorded on a non-transitory data carrying medium which, when processed by a data processing terminal connected to a network, configures the terminal to perform the steps of the method according to claim 1.

20. A set of instructions recorded on a non-transitory data carrying medium which, when processed by a data processing terminal connected to a network, configures the terminal as a system according to claim 10.

* * * * *